United States Patent [19]

Herve

[11] Patent Number: 4,638,120
[45] Date of Patent: Jan. 20, 1987

[54] METHOD AND SYSTEM FOR TRANSMISSION OF CONFIDENTIAL DATA

[75] Inventor: Robert J. L. A. Herve, Versailles, France

[73] Assignee: Compagnie Internationale pour l'Informatique Cii Honeywell Bull, Paris, France

[21] Appl. No.: 820,594

[22] Filed: Jan. 21, 1986

Related U.S. Application Data

[63] Continuation of Ser. No. 657,470, Oct. 4, 1984, abandoned, which is a continuation of Ser. No. 235,505, Feb. 18, 1981, abandoned.

[30] Foreign Application Priority Data

Mar. 3, 1980 [FR] France ............................... 80 04701

[51] Int. Cl.$^4$ ............................................. H04L 9/02
[52] U.S. Cl. ............................... 178/22.08; 178/22.15; 178/22.16
[58] Field of Search ............... 178/22.05, 22.07, 22.13, 178/22.08, 22.15, 22.16; 340/825.34

[56] References Cited

U.S. PATENT DOCUMENTS

| | | | |
|---|---|---|---|
| 3,291,908 | 12/1966 | Ehrat | 178/22.13 |
| 3,781,473 | 12/1973 | Goode et al. | 178/22.15 |
| 4,200,770 | 4/1980 | Hellman et al. | 178/22.13 |
| 4,206,315 | 6/1980 | Matyas et al. | 340/825.34 |
| 4,211,919 | 7/1980 | Ugon | 178/22.08 |
| 4,264,782 | 4/1981 | Konheim | 178/22.08 |
| 4,309,569 | 1/1982 | Merkle | 340/825.34 |
| 4,369,332 | 1/1983 | Campbell, Jr. | 178/22.18 |

FOREIGN PATENT DOCUMENTS 577216  6/1976  Switzerland.

Primary Examiner—Salvatore Cangialosi
Attorney, Agent, or Firm—Kerkam, Stowell, Kondracki & Clarke

[57] ABSTRACT

In a system for the transmission of confidential data between a transmitter (1) and a receiver (3), the transmitter (1) transmits a standard key E to the receiver (3). The standard key E preferably is a random number generated within the transmitter (1). An element at the location of the transmitter (1) calculates an intrinsic key $R_1$ for coding the data to be transmitted, and an element at the location of the receiver calculates an intrinsic key $R_2$ for decoding the data. The calculation of each of the intrinsic keys $R_1$ and $R_2$ is accomplished in each case by a microprocessor (4' and 5') situated within a portable object (4 and 5) which also includes a memory (4" and 5") storing a program, a secret code S, and an identification code $I_n$. The intrinsic keys $R_1$ and $R_2$ are each calculated as a function of the secret code S, the identification code $I_n$, and the standard key E. The portable objects at the transmitter and receiver ends of the system must be matched.

14 Claims, 4 Drawing Figures

METHOD AND SYSTEM FOR TRANSMISSION OF CONFIDENTIAL DATA

This is a continuation of application Ser. No. 657,470, filed Oct. 4, 1984, now abandoned, which is a continuation of Ser. No. 235,505, filed Feb. 18, 1981, now abandoned.

BACKGROUND OF THE INVENTION

The present invention relates to a method and system for transmission of confidential data. The present invention is related to the invention to which commonly-assigned copending application Ser. No. 200,785, filed Oct. 27, 1980, by Robert J. L. Herve, and entitled "SYSTEM AND PROCESS FOR IDENTIFICATION OF PERSONS REQUESTING ACCESS TO PARTICULAR FACILITIES" is directed, the entire disclosure of which is hereby expressly incorporated by reference.

More particularly, the invention relates to systems in which data are transmitted in the form of messages represented in a binary code, as well as in other forms. These messages are coded by means of a coding key upon transmission, and then decoded for restoration to their original clear form upon being received. These systems have at least two disadvantages. The first is the mathematical function enabling decoding of the coded message must be strictly the inverse of the function enabling the message to be encoded. The safety of these systems resides mainly in the fact that the functions applied are complex.

The second disadvantage is the credibility of these systems is assured only if the keys may be easily altered in the course of time, which implies organizing confidential message transmission services for dispatching the keys to the users of the transmission system.

SUMMARY OF THE INVENTION

The present invention seeks to eliminate these and other disadvantages by providing for utilization of two separate coding keys. The first is a standard key E transmitted directly in clear from the transmitter to the receiver. The second is an intrinsic key R calculated simultaneously at the transmitter and the receiver locations. The intrinsic key R is a function of the standard key E, of an identification code $I_n$ linked with the message which is transmitted, and of a secret code S stored in two devices situated at the transmitter and receiver respectively, or at the transmitter and receiver locations. The intrinsic key $R_1$ calculated at the transmitter location is used for encoding the message transmitted, and the intrinsic key $R_2$ calculated at the receiver location is used to decode the coded message transmitted.

If the calculating function employed at the transmitter and receiver locations is the same and if the secret code S stored at these locations is the same, the intrinsic keys R calculated are identical. Under these conditions, all that is needed is to utilize, at the transmitter and receiver locations, an operator which allows of simultaneous encoding of the message by means of the intrinsic key $R_1$ calculated upon transmission and decoding by means of the intrinsic key $R_2$ calculated upon reception. These coding and decoding operations may easily be performed by means of logic circuits of the combinatory type, for example EXCLUSIVE-OR circuits.

The system of the invention makes it possible to perform constant modification of the intrinsic keys R calculated at the transmitter and receiver locations by random alteration in the course of time of the value of the standard key E.

According to another feature of the invention, the calculation of each of the intrinsic keys R at the transmitter and receiver locations is accomplished in each case by a processor situated within a portable object which also comprises a memory wherein is stored a program p for calculation of the function for determining the intrinsic key R as a function of the secret code S also stored in the memory, of the standard key E, and of the identification code $I_n$ linked with the message. These portable objects are each placed at the disposal of the persons entrusted with transmitting and receiving the messages.

The system may then operate only if both persons have strictly matched portable objects, which amounts to saying, for example, that the processing units must be actuated by the same program p and that the memories must contain the same secret code S. It is obvious that a fraudulent person lacking both the program p and the secret code S will be unable to calculate the intrinsic key R enabling him to decode the message transmitted. His task becomes ever more difficult since the system alters the standard key E in a random manner with each clock pulse.

According to another feature of the invention, and for the purpose of increasing the security of the system in a practically absolute manner, each portable object of the system contains within its memory a table of the identification codes $I_n$ related to the messages which each person will be authorized to transmit and receive.

The identification code related to the message contained in the memories of the portable objects are located or "pointed" to by address generators at the transmitter and receiver locations. These address generators establish correspondence between the identification code $I_n$ linked with the message and the address of the identification code $I_n$ contained in the memory of the portable object. The message transmission may then only occur correctly if the address generator and the portable objects have been able to establish the identity of the identification code $I_n$ related to the message.

BRIEF DESCRIPTION OF THE DRAWINGS

The invention will now be further described by way of example, with reference to the accompanying drawings, in which.

DETAILED DESCRIPTION OF THE PREFERRED EMBODIMENT

Figure 1:
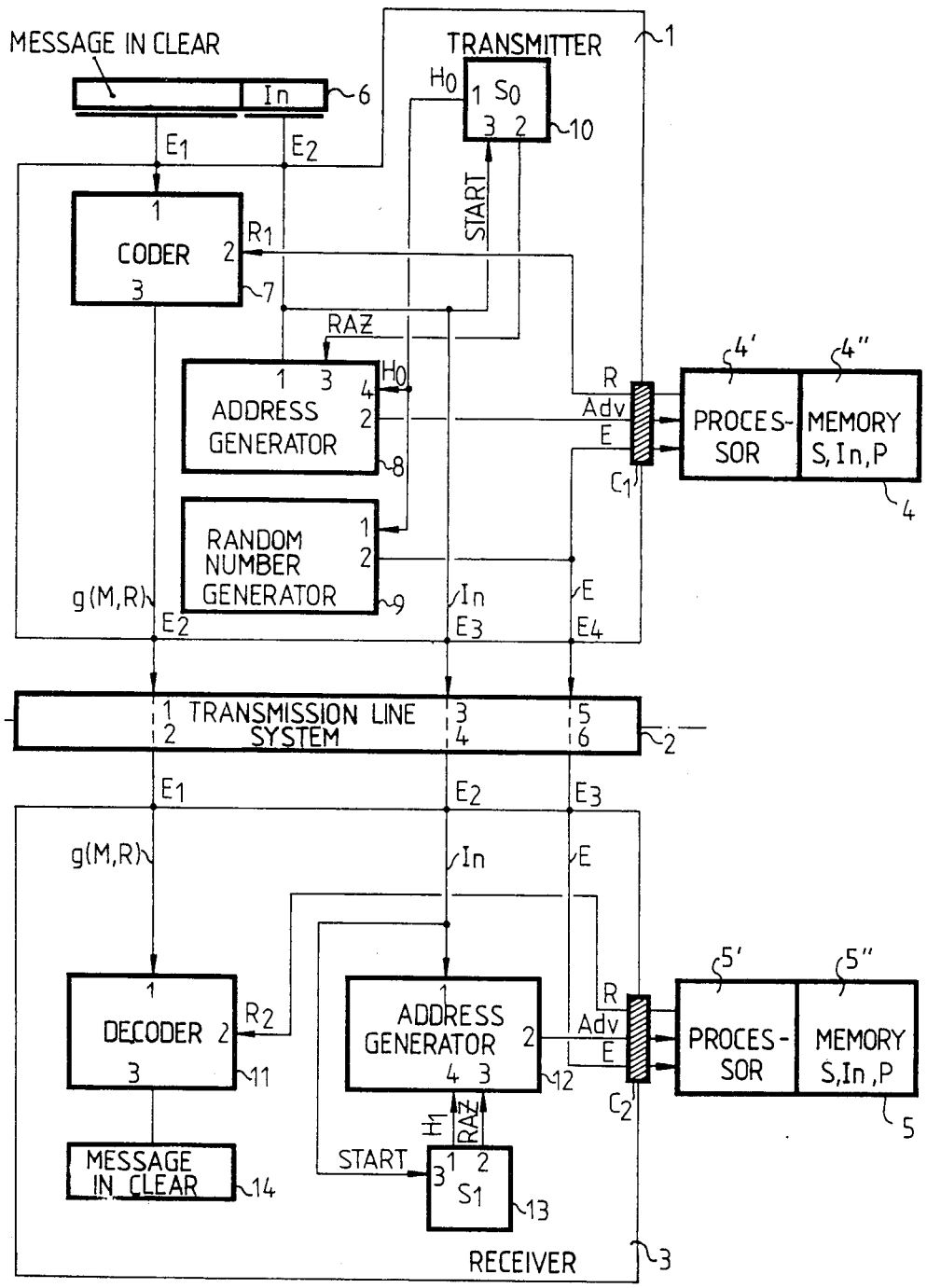
FIG. 1 illustrates the arrangement of one embodiment of a data processing system in accordance with the invention.

The system illustrated in FIG. 1. comprises a transmitter 1 and a receiver 3 interconnected by a transmission line system 2. The transmitter 1 and receiver 3 are adapted to be coupled temporarily to portable objects 4 and 5 comprising, respectively, processing means in the form of microprocessors 4' and 5', as well as memories or storage devices 4" and 5". Portable objects of this kind are described in commonly-assigned Ugon U.S.

Pat. No. 4,211,919, issued July 8, 1980, and entitled "PORTABLE DATA CARRIER INCLUDING A MICROPROCESSOR", the entire disclosure of which is hereby expressly incorporated by reference.

The storage devices 4" and 5" of the portable objects 4 and 5 are divided into at least three sections. The first is a secret section containing a secret code S which is written when the portable object 4 or 5 is initialized. The secret code S may thereafter be read only by the processor 4' or 5' of the portable object 4 or 5 itself, and cannot in any event be read from the outside.

The second section contains the identification codes $I_n$ related to the messages which the bearer of the object is authorized to transmit or receive. The writing of the identification codes $I_n$ in the second memory section may be protected for reasons of security by a key code unknown to the bearer of the portable object.

The third section contains a program p whose task is to calculate an intrinsic key R from the codes S, $I_n$ and from a standard key E. This is summarized by the formula $R = p(S, I_n, E)$. Once written, the program p cannot be altered and may advantageously be contained in a read-only memory (ROM).

While in no way intended to limit the scope of the invention, the information stored in the memories 4" and 5" and operated on by the processors 4' and 5' may be that which is disclosed in the above-identified commonly-assigned Herve application Ser. No. 200,785, filed Oct. 27, 1980, as is repeated below in the following specific example.

First, the data words have the following lengths in this specific example: The identification code $I_n$ is 32 bits long; the standard key E is also 32 bits long; and the secret code S is 64 bits long. The result of the computation, the intrinsic key R, is 64 bits long.

The computation effected by the instructions comprising the stored program p executed in the microprocessors 4' and 5' has the following three overall steps:

(1) First, an intermediate result, $R_1$, is calculated by concatenating E with $I_n \cdot R_1 = (E, I_n)$.

(2) Second, another intermediate result, $S_1$, is calculated by an EXCLUSIVE-OR operation of $R_1$ with S. $S_1 = R_1 \oplus S$.

(3) Third, the result, R, is calculated by multiplying S with $S_1$ with $R_1$, modulo $2^{64} - 1$. $R = S \times S_1 \times R_1$, modulo $2^{64} - 1$.

This computation can be performed in a microprocessor carried on a card such as is disclosed in the above-referenced Ugon U.S. Pat. No. 4,211,919. By way of example, a suitable commercially-available memory device which may be employed as the memories 4" and 5" is a Mostek Type No. MK4022. Similarly, the microprocessors 4' and 5' may each comprise an Intel Type No. 8080 or an Intel Type No. 8085.

The following lists one form of machine-language program which may be employed as the programs p. This program listing assumes that registers denoted A, B, C, D and T (not shown) are available:

EXAMPLE PROGRAM LISTING

| Instructions | Comments |
|---|---|
| 001 Load $I_n \to A$ | Load registers A, B and C with the parameters $I_n$, E, S |
| 002 Load $E \to B$ | |
| 003 Load $S \to C$ | |
| 004 MOV $B \to A$ | Concatenate E with $I_n$ to |

-continued

| Instructions | Comments |
|---|---|
| | generate $R_1$, and leave in register A |
| 005 MOV A, T | Also store $R_1$ in register T |
| 006 X CT | $S_1 = R_1 \oplus S$, to T |
| 007 MUL (T C) | $S \times S_1$ to T |
| 008 MUL (T A) | $R = S \times S_1 \times R_1$ to T |
| 009 Load $2^{64} - 1 \to D$ | Load value $2^{64} - 1$ into register D |
| 010 COMP (T, D) | if $R \geq 2^{64} - 1$ |
| 011 IF (1) | return to 1 |
| 012 END | |

The particular transmission line system 2 employed is not important insofar as the present invention is concerned, and may be selected as desired from among available forms of transmission line systems such as those using an electric cable, or an optical, acoustic, magnetic or radio wave connection.

The FIG. 1 transmitter 1 comprises a coding device 7, a first address generator 8, a random number generator 9, and a sequencer $S_0$ 10.

The FIG. 1 receiver 2 comprises a decoding device 11, a second address generator 12, and a sequencer $S_1$ 13.

The address generators 8 and 12 are described in detail hereinbelow with reference to FIG. 2. The sequencers $S_0$ 10 and $S_1$ 13 are described in detail hereinbelow with reference to FIG. 3.

The portable objects 4 and 5 may be coupled temporarily to the transmitter 1 and to the receiver 3 by respective coupling means $C_1$ and $C_2$.

The coding device 7 receives, at its input 1, the message in clear 6 which is to be coded and, at its input 2, the intrinsic coding key $R_1$. A message g(M,R) is coded by the device 7 and transmitted from the device 7 output 3 via the transmission line 2 to the decoding device 11 input 1. The message g(M,R) is then decoded by the device 11 by virtue of reception at its input 2 of the intrinsic decoding key $R_2$. The message then appears in clear at device 11 output 3 and is displayed at 14. (The coding device 7, the decoding device 11, and the form of encoded message g(M,R) are described in detail hereinbelow with reference to FIG. 4.)

The intrinsic coding key $R_1$ is calculated and supplied by the processor 4' of the portable object 4. Similarly, the intrinsic decoding key $R_2$ is calculated and supplied by the processor 5' of the portable object 5.

The first address generator 8 calculates the address (Adv) of the identification code $I_n$ of the message situated in the memory 4" of the portable object 4 from the identification code $I_n$ linked to the message in clear 6 and transmits this address via its output 2 to the data and address bus of the portable object 4 (see commonly-assigned Ugon U.S. Pat. No. 4,211,919), via the coupling means $C_1$. The first address generator 8 is reset to an initial state by the signal RAZ transmitted to its input 3 via the output 2 of the sequencer $S_0$ 10, and is activated by clock signals $H_0$ transmitted to its input 4 via the output 1 of the sequencer $S_0$ 10. The sequencer $S_0$ 10 is energized by a START signal as soon as a message is transmitted to the input $E_2$ (identification code $I_n$ with message in clear 6) of the transmitter 1.

The system of the invention makes it possible to perform constant modification of the intrinsic keys R calculated in the processors 4' and 5' associated respectively with the transmitter 1 and receiver 3 by random alteration of the standard key E as a function of time. Specifically, the standard key E is generated by a random number generator 9 which may comprise a simple ring counter. The generator 9 supplies a random number forming the standard key E in bit serial form as clock signals $H_0$ transmitted by the sequencer $S_0$ 10 are input to the random number generator 9. This random number forming the standard key E is transmitted from the output 2 of the generator 9 to the respective inputs of the portable objects 4 and 5 via their coupling devices $C_1$ and $C_2$.

In the same way as for the first address generator 8 in the transmitter 1, the second address generator 12 in the receiver 3 is supplied at its input 1 with the identification code $I_n$ (transmitted to it via the transmission line system 2) so that it may calculate and deliver at its output 2 the address of the corresponding identification code $I_n$ in the memory 5" of the portable object 5. This address generator 12 is reset to an initial state by the signal RAZ applied to its input 3 by the sequencer $S_1$ 13, and is activated by a clock signal $H_1$ fed to its input 4 by the sequencer $S_1$ 13. The sequencer $S_1$ 13 is energized via its input 3 as soon as a message is transmitted via the transmission line 2.

Figure 2:
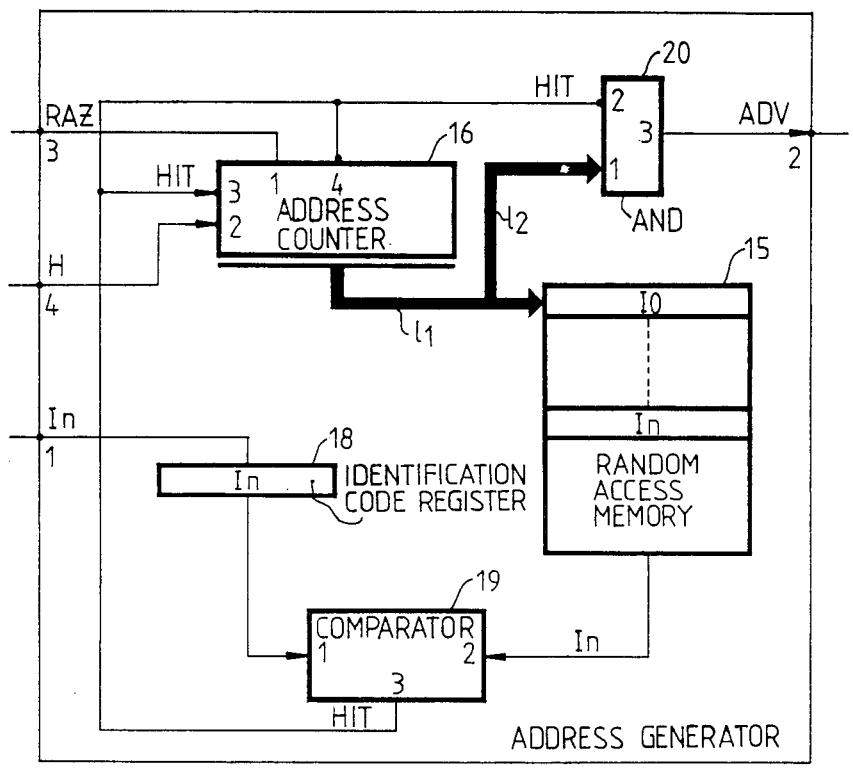
FIG. 2 is an illustration of one of the address generators of FIG. 1.

With reference now to FIG. 2, there is shown one embodiment of an address generator suitable for use as the address generators 8 and 12 of FIG. 1. The FIG. 2 address generator comprises a memory 15 which may for example be either a Random Access Memory (RAM), a Programmable Read Only Memory (PROM), or an Erasable Programmable Read Only Memory (EPROM). This memory 15 contains a table of all identification codes $I_0$ through $I_n$ of the messages which the system is authorized to transmit.

The memory 15 is addressed by means of an address counter 16. This address counter 16 is stepped by means of the clock signal H applied at the input 4 of the address generator, and is reset to zero by the signal RAZ applied at the input 3 of the address generator.

The address counter 16 determines the address of the identification code $I_n$ contained in the memory 4" or 5" of the portable object 4 or 5 and corresponding to the message 6 which is to be transmitted. This determination is performed by an identification code register 18 and a comparator 19. The identification code $I_n$ accompanying the message 6 which is to be transmitted is fed into the identification register 18, after which the address counter 16 progresses at the rate of the clock H so as to address and read the identification codes $I_n$ contained in the memory 15. The identification codes $I_n$ are thus presented successively at an input of the comparator 19 which compares them to the identification code contained in the identification code register 18.

If correspondence is established by the comparison, progression of the address counter 16 is stopped by application of the signal HIT to address counter 16 input 4, the signal HIT being supplied by output 3 of the comparator 19. At the same time, the contents of the address counter 16 (representing the address of the location within the portable object 4 or 5 of the identification code $I_n$ of the message which is to be transmitted) is transmitted via an AND gate 20 (activated at its input 1 by the signal HIT) as a signal ADV to the output 2 of the address generator.

Figure 3:
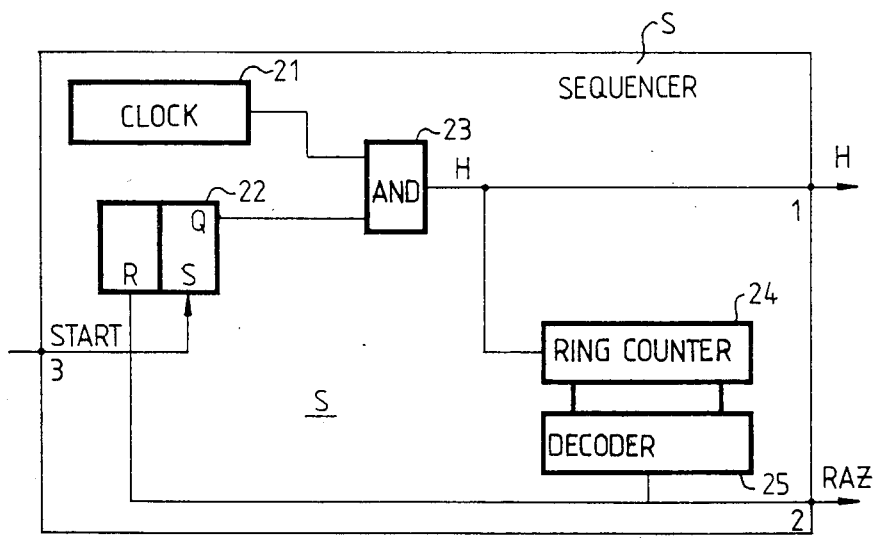
FIG. 3 is an illustration of one of the sequencers of FIG. 1.

Similarly, with reference now to FIG. 3, an embodiment of a sequencer suitable for use as the sequencers $S_0$ 10 and $S_1$ 13 of FIG. 1 is shown. The FIG. 3 sequencer comprises a clock 21, an RS flip-flop 22, an AND gate 23, a ring counter 24, and a decoder 25. An input of the AND gate 23 receives the clock signals coming from the clock 21, these signals being retransmitted at the AND gate 23 output towards the output 1 of the sequencer when the other input of the gate 23 is activated via the Q output of the flip-flop 22. The Q output of the flip-flop 22 assumes a logic high state (binary "1") when it is triggered at its Set input (S) by the START signal applied to the input 3 of the sequencer. This START signal may comprise a particular bit of the identification code $I_n$ accompanying the message 6 which is to be transmitted. The signal H is transmitted to the input of the ring counter 24 of which a particular state is decoded by the decoder 25 to reset the flip-flop 22 to the zero state and to deliver the RAZ signal at the output 2 of the sequencer.

Figure 4:
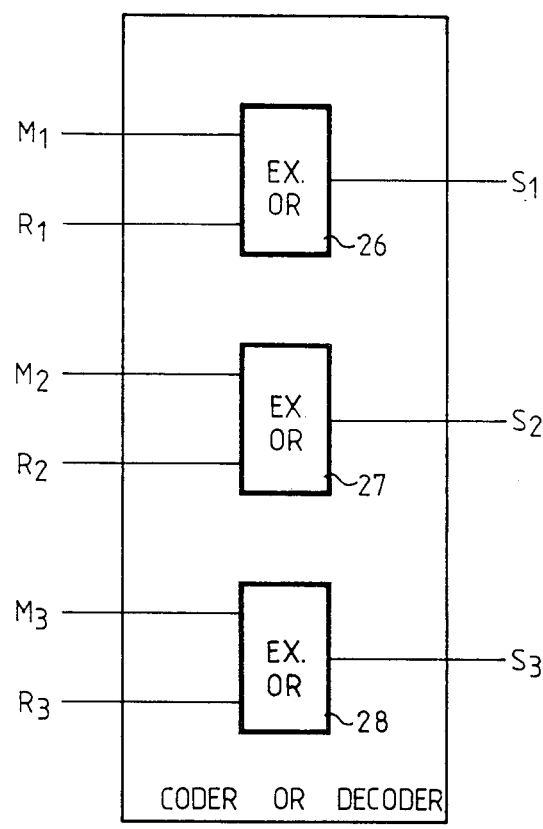
FIG. 4 illustrates the combinatory circuit utilized in the coding and decoding operations.

With reference now to FIG. 4, there is shown a combinatory circuit such as may comprise both the FIG. 1 coding device 7 and the FIG. 1 decoding device 11. As shown, the FIG. 4 circuit comprises EXCLUSIVE-OR logic gates. In operation, upon transmission, a bit $M_i$ of the message to be transmitted and a bit $R_i$ of the intrinsic key are applied, respectively, to an input of an EXCLUSIVE-OR circuit in such manner that the resulting combination satisfies the Boolean logic equation $S_i = M_i \oplus R_i$. Upon reception, decoding is performed by also employing an EXCLUSIVE-OR circuit. The signals $S_i$ and $R_i$ are applied to two of its inputs in such manner as to restore the bits $M_i$. The equation for the restored $M_i$ is $M_i = S_i \oplus R_i$.

The example of FIG. 4 shows an embodiment of a coding circuit for a message M and an intrinsic key word R each of three bits. The EXCLUSIVE-OR gates 26, 27 and 28 deliver the signals $S_1$ to $S_3$ as follows:

$$S_1 = M_1 \oplus R_1$$

$$S_2 = M_2 \oplus R_2$$

$$S_3 = M_3 \oplus R_3$$

Similarly, for decoding, EXCLUSIVE-OR gates deliver the signals $M_1$ to $M_3$ of the restored message M as follows:

$$M_1 = S_1 \oplus R_1$$

$$M_2 = S_2 \oplus R_2$$

$$M_3 = S_3 \oplus R_3$$

The restored message is thus identical to the original message, regardless of the specific message and the specific intrinsic key R, so long as the same intrinsic key R is used for both coding and decoding.

In summary, the operation of the system for transmission of coded data in accordance with the invention is as follows:

The appearance of the message in clear 6 at the inputs $E_1$ and $E_2$ of the transmitter 1 causes the triggering of the respective address generators 8 and 12 of the transmitter 1 and the receiver 3, as well as of the random number or standard key E generator 9. The identity of the message is recognized by the respective address generators 8 and 12 which then transmit to the portable objects 4 and 5 the address (ADV) of the corresponding identity code $I_n$ in the portable objects 4 and 5. The intrinsic keys $R_1$ and $R_2$ are then calculated by the processors 4' and 5' of each of the portable objects 4 and 5 by means of a function $R_x = p(E, S, I_n)$, one example of which is given hereinabove. If the portable objects 4 and 5 are of the same nature, that is if each contains the same program p, the same code S and the same identification code $I_n$, the calculated intrinsic standard keys $R_1$ and $R_2$ are then the same. The instrinsic key $R_1$ is applied to the coding device 7 in the transmitter 1, and the intrinsic key $R_2$ is applied to the decoding device 11 in the receiver 3. The restored message received at 14 is then identical to the transmitted message in clear 6.

The example which has been given of a perferred embodiment of the invention is not in any way intended to limit the scope of the invention, as it is understood that any one skilled in the art well acquanted with data transmission techniques will be able to envisage other embodiments of the invention without thereby exceeding its scope.

What is claimed is:

1. A method for transmission of confidential data between a transmitter and a receiver connected by a transmission line system, the transmitter including a coding device and the receiver including a decoding device, said method comprising:

generating a first key and transmitting the first key to the receiver;

calculating in a first portable electronic object coupled to the transmitter a second key from a first code stored in the first portable electronic object, from a second code related to the data to be transmitted and which identifies data authorized to be transmitted by a bearer of the first portable electronic object, and from the first key;

transmitting the second code to the receiver;

coding at the transmitter the data to be transmitted with the second key;

calculating at the receiver, in a second portable electronic object coupled to the receiver, a third key using the first key and the second code and a third code stored in the second portable electronic object; and decoding the data received with the third key calculated at the receiver.

2. A method for transmission of confidential data according to claim 1, wherein the second coding and third decoding keys calculated at the transmitter and receiver locations are the same.

3. A method for transmission of confidential data according to claim 1, wherein the first key generated and transmitted by the transmitter to the receiver is a random number.

4. A system for transmission of confidential data between a transmitter and a receiver interconnected by a transmission line system, the transmitter and receiver respectively including a coder and a decoder of the data transmitted, said system comprising:

random number generator means included in the transmitter for generating a random number and for transmitting the random number to the receiver;

first and second processing means for calculating at the transmitter and the receiver locations, respectively, a coding key and a decoding key;

means located at the transmitter for supplying the coding key to said coder for encoding the data transmitted; and means located at the receiver for supplying the decoding key to said decoder for decoding the data received, the first and second processing means comprising first and second portable electronic objects adapted to be detachably coupled to the transmitter and to the receiver, respectively, and wherein said processing means each include means for calculating said keys as a function of the random number, a first code stored within said portable electronic objects, and a second code which is related to the data and which identifies data authorized to be transmitted by a bearer of the first portable electronic object.

5. A system for transmission of confidential data between a transmitter and a receiver according to claim 4, wherein said portable electronic objects each include:

a storage device containing the first and second codes and a program;

coupling means adapted for connection to the transmitter or receiver for receiving the randon number; and the processing means is connected to the coupling means and to said storage device for calculating said coding and decoding keys, by execution of the program, the calculating means comprising said program.

6. A system for transmission of confidential data between a transmitter and a receiver according to claim 5, wherein the first code stored within said portable electronic objects is unknown even to the bearers of said objects and is protected against external readout.

7. A method for transmission of confidential data between a transmitter and a receiver connected by a transmission line system, the transmitter including a coding device and the receiver including a decoding device, said method comprising:

causing the transmitter to generate a first key and to transmit the first key to the receiver; and calculating as a function of at least the first key a second key at the transmitter location for coding the data to be transmitted, and calculating as a function of at least the first key a third key at the receiver location for decoding the data received, said calculating being performed in first and second portable electronic objects detachably coupled to the transmitter and to the receiver, respectively, and wherein said calculating steps comprises, in each portable electronic object, producing using the first key and a first code a first intermediate result, combining modulo 2 the first intermediate result with a second code to produce a second intermediate result, and multiplying the second intermediate result by the second code, module $2^n - 1$, where n is an integer corresponding to a number of bits which comprises the second code.

8. A method for transmission of confidential data according to claim 7, wherein the intrinsic coding and decoding keys calculated at the transmitter and receiver locations are the same.

9. A method for transmission of confidential data according to claim 8, wherein the first key comprises a random number, and the second code comprises a code stored in said portable electronic objects which is unknown to a bearer of said portable electronic objects and which is protected against external readout.

10. A system for transmission of confidential data between a transmitter and a receiver interconnected by a transmission line system, the transmitter and receiver respectively including a coder and a decoder of the data transmitted, said system comprising;

means included in the transmitter for generating a first key and for transmitting the first key to the receiver;

first processing means located at the transmitter for calculating a coding key as a function of the first key for encoding the data and for supplying the coding key to the coder; and second processing means located at the receiver for calculating a decoding key as a function of the first key for decoding the data received and for supplying the decoding key to the decoder, the first and second processing means being included in respective first and second portable electronic objects adapted to be detachably coupled to the transmitter and to the receiver, respectively, and wherein said processing means each include first means for combining the first key and a first code to produce a first intermediate result, second means for combining modulo 2 the first intermediate result and a second code to product a second intermediate result, and third means for multiplying the second intermediate result by the second code, modulo $2^n - 1$, where n is an integer corresponding to a number of bits which comprise the second code.

11. A system for transmission of confidential data between a transmitter and a receiver according to claim 10, wherein a secret code is stored within the second code is each of said portable electronic objects and the first and second processing means use the code for calculating the coding key and the intrinsic decoding key, respectively, the secret code being unknown even to the bearers of said objects and protected against external readout.

12. The system of Claim 5, wherein said transmitter and receiver each include an address generator for addressing identification codes stored in said storage device, the identification codes being related to messages a bearer of the portable electronic object is authorized to transmit or receive, and said identification codes comprising the second code.

13. The method of claim 9, wherein the first code comprises an identification code related to the data to be transmitted, the identification code being stored in said portable electronic objects.

14. The system of claim 10, wherein the first key is a random number, and said generating means generates a new random number for each message to be transmitted.

* * * * *